April 20, 1965   R. W. COREY   3,179,863
TENSION CONTROL SYSTEM USING A HIGH SLIP MOTOR
DRIVEN VARIABLE RATIO TRANSMISSION
Filed May 31, 1960
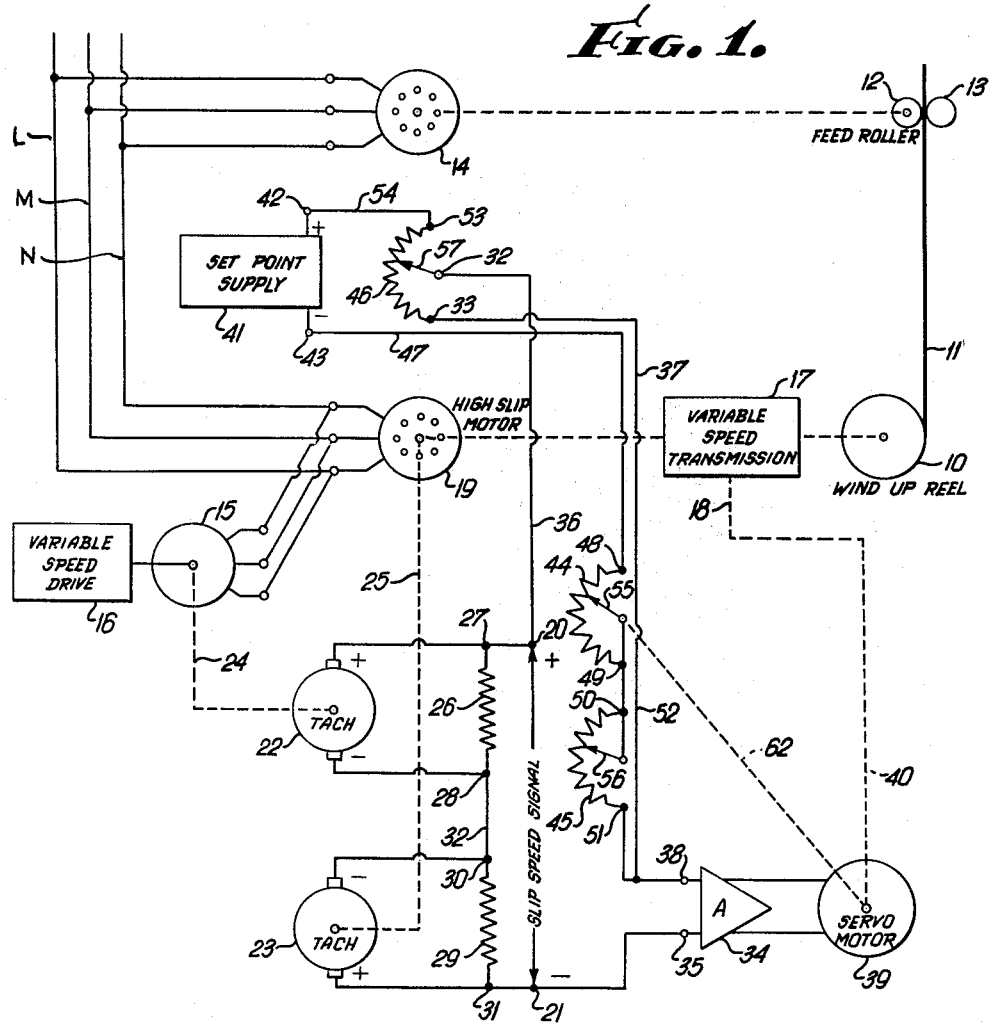
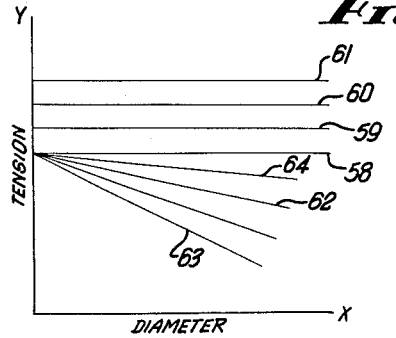
INVENTOR.
ROBERT W. COREY
BY
Flam and Flam
ATTORNEYS.

United States Patent Office 3,179,863
Patented Apr. 20, 1965

3,179,863
TENSION CONTROL SYSTEM USING A HIGH SLIP MOTOR DRIVEN VARIABLE RATIO TRANSMISSION
Robert W. Corey, Anaheim, Calif., assignor, by mesne assignments, to Emerson Electric Co., a corporation of Missouri
Filed May 31, 1960, Ser. No. 32,673
14 Claims. (Cl. 318—6)

This invention relates to a system for controlling the tension of material wound upon a rewind roll or drum.

It is possible to do this by controlling the speed of the rewind reel. Thus, if the speed of supply of material to the rewind reel is constant, for example, the speed of the rewind roll must be continuously reduced in order to avoid build up of stress resulting from the web being pulled faster than its feed. Speed control is accomplished by using a variable ratio transmission mechanism of the type illustrated in United States Letters Patent No. 2,398,235, issued April 9, 1946 in the name of Frederick O. Luenberger, and entitled Variable Ratio Transmission.

It is also important in systems of this character that the control of speed be effected without physical engagement with the web itself. Thus, it is often undesirable to contact the strip or web with "dancer rolls" which might interfere with operations performed upon the material. Accordingly, the primary object of this invention is to provide an improved speed control system for a variable ratio transmission mechanism that responds to incipient changes in web tension to maintain the tension constant despite continually increasing rewind roll diameters, and all without requiring any physical contact with the strip or web itself.

Various control systems have been devised operable in conjunction with such continuously adjustable variable speed transmission mechanisms for the purpose of maintaining tension constant during conditions of constant speed. An object of this invention is to provide a system that maintains constant web tension despite varying web speeds. By so doing, a more versatile system is provided. Furthermore, this allows for stopping the system without causing any discontinuity in web tension.

Another object of this invention is to provide a device of this character that provides a gradual reduction of tension as a function of the roll diameter itself. Thus, it is often necessary in order to hold a rewind roll in proper wound up relationship or for other reasons that the tension be reduced as the wind-up progresses.

Another object of this invention is to provide a system of this character in which even during operation, the tension can readily be adjusted as well as the rate of change of tension.

Another object of this invention is to provide a control system of this character that automatically determines the appropriate tension as a direct function of windup reel diameter whereby the adjustment or control is preserved even when operation is resumed after a momentary shut down. In order to carry out this objective, the tapering of tension is directly correlated to a movable member that determines transmission ratio. Thus, the transmission ratio multiplied by windup reel diameter is constant. Hence, transmission ratio can be used indirectly to measure windup reel diameter.

This invention possesses many other advantages, and has other objects which may be made more clearly apparent from a consideration of one embodiment of the invention. For this purpose, there is shown a form in the drawings accompanying and forming a part of the present specification. This form will now be described in detail, illustrating the general principles of the invention; but it is to be understood that this detailed description is not to be taken in a limiting sense, since the scope of this invention is best defined by the appended claims.

Referring to the drawings:

FIGURE 1 is a diagram illustrating the operation of the control system; and

FIG. 2 is a graph illustrating web tension as a function of windup reel diameter and illustrating specifically the manner in which the web tension may be adjusted and tapered.

In FIG. 1 there is illustrated a windup reel 10 upon which a material 11 is wound. The material 11 may be metal, fabric, or any other material the tension of which is desirably controlled.

The web 11 is fed to the reel at a rate determined by numerous sets of process or feed rollers. The set immediately in advance of the windup reel 10 is illustrated at 12 and 13. Each set of feed rollers, for example at 12 and 13, is driven by its own induction motor 14. By controlling the frequency of the excitation to the induction motors 14, the process rollers operate in unison at faster or slower speeds. Thus, a variable frequency alternator 15 is provided that is driven at a speed determined by the setting of a variable speed drive 16. The alternator 15 provides variable frequency service to lines L, M and N for the induction motors 14.

As material is wound upon the windup reel 10 its diameter increases. All other factors being equal, the tension of the material tends to build up. To maintain tension constant, quite obviously the speed of operation of the windup reel must be reduced. To accomplish this purpose, a variable speed transmission mechanism 17 is provided for the windup reel 10. The variable speed transmission mechanism 17 has an adjusting shaft or other movable element 18 that changes the ratio of transmission in a continuous or stepless manner. The variable speed transmission mechanism 17, in turn is driven by an induction motor 19 that is supplied from the lines L, M and N. For purposes presently to appear, the induction motor 19 is designed to operate at substantial slip, say of the order of eight to thirteen percent. This may be contrasted to the slip of the motors as at 14, which may operate at slips of the order of one half of one percent.

The power at the windup reel 10 used to wind up the material is equal to the product of the material tension and the web velocity. If, then, the tension is to be constant for any speed of operation, the power expended in winding up the material must be directly proportional to web velocity.

The power expended in winding up the material is directly proportional to the power output of the high slip motor 19 that drives the windup reel. It is known that the slip speed of an induction motor, over reasonable ranges of load, is directly proportional to developed torque. Hence, slip speed multiplied by induction motor speed is proportional to torque multiplied by induction motor speed. This, of course, is developed power. Hence the power output can be made directly proportional to induction motor speed by holding the slip speed of the induction motor constant. The induction motor speed is furthermore proportional to web speed since the induction motor 19 is powered from the same service lines L, M and N as are the feed roller motors as at 14. Hence, power output can be made directly proportional to web speed by holding the slip speed of the motor 19 constant. Accordingly, by utilizing slip speed as the controlled variable in a servo system it is possible to maintain web tension constant despite changes in web speed. FIG. 1 illustrates such a servo system. A signal corresponding to slip speed is derived between terminals 20 and 21 by a differential arrangement of two tachometers 22 and 23. The tachometer 22 is operated at synchronous speed by having its shaft as at 24 connected to the variable frequency alternator 15. The tachometer 23 has its shaft connected, as at 25, to the induction motor 19. Slip speed, accordingly, can be represented by the difference in output of the two tachometers. By making the motor 19 of characteristically high slip, a significant differential output can be obtained from the tachometers 22 and 23 whereby slip speed is sensitively measured.

The differential is obtained by appropriately connecting the output circuits of the tachometers 22 and 23. Thus, the tachometer 22, which may be of any suitable type, has a load circuit provided by a resistor 26 connected across plus and minus tachometer terminals 27 and 28. The tachometer 23 has a load circuit provided by a resistor 29 connected across minus and plus tachometer terminals 30 and 31.

The tachometers are suitably calibrated so that their outputs are identical, speed for speed. Hence, the difference in the voltage across load resistors 26 and 29 accurately measures the slip speed. For this purpose, the minus terminals 28 and 30 of the tachometers are connected by a lead 32, and the output, which is the net difference, is taken across the plus terminals 31 and 27 which are respectively common to the terminals 21 and 20. Since the tachometer 22 operates at synchronous speed, its output is greater than that of tachometer 23. The terminal 20 is then positive relative to the terminal 21.

This slip speed signal as it exists across the terminals 21 and 20 is in turn compared with a reference standard. This reference standard is provided across terminals 32 and 33 in a manner to be explained more fully hereinafter. The net difference, or error signal is applied via a polarity sensitive amplifier 34 to a polarity sensitive servo motor 39 that by adjusting the transmission 17 confines the error signal to a small value. The set point voltage across terminals 32 and 33 adds differentially to the slip speed signal across input terminals 35 and 38 of the amplifier 34. The following input circuit may be traced: amplifier terminal 35, slip speed signal terminals 21, 20, lead 36, set point terminals 32, 33 and lead 37 to the other amplifier input terminal 38. The set point terminal 32 is positive relative to set point terminal 33. Hence, this terminal 32 connects to the positive terminal 20 of the slip speed set to provide a differential effect.

The servo motor 39 has an output shaft at 40 connected to the adjusting shaft 18 of the variable speed transmission mechanism 17. Thus when the slip speed is greater than the reference standard, the amplified error signal through servo motor 39 reduces the transmission ratio whereby slip speed is held constant irrespective of web velocity. The amplifier 34 includes stabilizing means and sensitivity controls normally provided in accordance with accepted servo system design.

To provide a predictable voltage across the set point terminals 32 and 33, a regulated direct current power supply 41 is provided. The power supply 41, terminals 42 and 43 are connected to a load comprising three potentiometer resistors 44, 45 and 46. The circuit can be traced as follows: terminal 43 of the power supply 41, a terminal 48 at one end of resistor 44, resistor 44, its opposite terminal 49, one terminal 50 of the potentiometer resistor 45, resistor 45, its opposite terminal 51 which is common to amplifier terminal 38, lead 52, terminal 53 of the set point supply which is at one end of resistor 46, terminal 53 at the other end of resistor 46, lead 54 to the opposite set point supply terminal 42.

The potentiometer resistors 44 and 45 each have shunt arms 55 and 56 capable of removing from circuit relationship any or all of the corresponding resistors. The shunt arm 55 is permanently connected to resistor terminal 49, and it engages the resistor 44 at any position therealong. The included portion of the resistor 44 is thus shunted. Similarly, the arm 56 is permanently connected to the terminal 50 of the resistor 45.

Assuming a fixed setting for shunt arms 55 and 56, a definite voltage exists across resistor 46. A selected fixed fraction of this voltage is applied to the set point terminals 33 and 32 by having an arm or slider 57 engageable with the resistor connected to set point terminal 32. As the arm 57 is moved, the control point is shifted, and a value of tension is selected. This is indicated by successive horizontal lines 58, 59, 60 and 61 in the graph of FIG. 2, in which tension is plotted along the Y axis and windup reel diameter along the X axis. The resistors 44 and 45 affect the set point voltage. By changing the included portion of the resistor 44, for example, as a function of windup reel diameter, the set point and hence the tension will correspondingly change. This serves as a means for tapering the tension and having the tension fall, say, along a line 62 of FIG. 2 as diameter increases. For this purpose the arm 55 is connected, as indicated at 62, to the servo motor 39 or the adjusting shaft 18 of the variable speed transmission mechanism 17. The position of the arm 55 thus corresponds to transmission ratio since the position of the shaft 18 directly determines transmission ratio. Transmission ratio is a direct measure of windup reel diameter, since their product remains constant in the process of control, neglecting small slip variations at different operational speeds. Accordingly, the set point can be made to decrease in direct proportion to windup reel diameter by appropriately connecting the servo motor shaft to the arm 55.

The extent that tension falls may be determined by controlling the relative effect of the resistors 44 and 45. Accordingly the resistor 45 is manually adjustable. When a substantial amount of the resistor 45 is included in the circuit, the resistor 44 has relatively small effect upon the set point voltage, and the set point voltage may then fall along a line 64 of FIG. 2. However, when the shunt arm 56 includes only a small portion of the resistor 45 in the circuit, the effect of the resistor 44 is substantial, and the set point voltage may then fall along a line 63.

After the resistor 45 is adjusted, the arm 57 may be moved to ensure that the desired starting tension is provided. For each starting tension, there is, of course, a family of sloping lines as at 62, 63 and 64.

Since the setting of the variable speed transmission mechanism 17 is a direct measure of windup reel diameter, then it is clear that without any reset functions at all, the appropriate tension for a given windup reel diameter is automatically accomplished. For example, after a reel has been wound, the system can be stopped, and material started on a new reel. Immediately the servo system resets the transmission 17 as well as the taper tension control arm 55 to a starting value. If the process slows down or ever stops before the windup is completed, the arm 55 holds its adjustment with the variable ratio transmission 17 to ensure against any discontinuity in tension upon resumption of speed.

A simple, versatile system for controlling tension is thus provided.

The inventor claims:

1. In a servo system for controlling the tension of material at a reel: a variable ratio transmission mechanism for driving the reel and having a member movable to vary the ratio of transmission; an induction motor for driving the variable ratio transmission mechanism; means for producing a signal that changes in accordance with change of slip speed of the inductor motor; and means connected to said movable member and responsive to said signal for correctively adjusting the ratio of the variable ratio transmission for maintaining the slip speed at said desired value.

2. In a servo system for controlling the tension of material at a reel: a variable ratio transmission mechanism for driving the reel and having a member movable to vary the ratio of transmission; an induction motor for driving the variable ratio transmission mechanism; means producing a signal proportional to slip speed of the induction motor; means providing a reference standard to which the slip speed signal may be compared to provide an error indication; and means connected to said movable member and operable upon indication of error for correctively adjusting the ratio of the variable ratio transmission for reducing the error.

3. The combination as set forth in claim 2 in which said induction motor has a designed high slip.

4. In a servo system for controlling the tension of material at a reel: a variable ratio transmission mechanism for driving the reel and having a member movable to vary the ratio of transmission; an induction motor for driving the variable ratio transmission mechanism; means producing a signal proportional to slip speed of the induction motor; means providing a reference standard to which the slip speed signal may be compared to provide an error indication; means connected to said movable member and operable upon indication of error for correctively adjusting the ratio of the variable ratio transmission for reducing the error; and means correlated with the adjustment of the variable ratio transmission mechanism for modifying the reference standard whereby tension is determined as a function of reel diameter.

5. In a servo system for controlling the tension of material at a reel: a variable ratio transmission mechanism for driving the reel and having a member movable to vary the ratio of transmission; an induction motor for driving the variable ratio transmission mechanism; means producing a signal that changes in accordance with change of slip speed of the induction motor; means connected to said movable member and responsive to said signal for correctively adjusting the ratio of the variable ratio transmission for maintaining the slip speed at said desired value; and means correlated with the adjustment of the variable ratio transmission mechanism for modifying the value with respect to which said slip speed is compared whereby tension is determined as a function of reel diameter.

6. In a servo system for controlling the tension of material at a reel: a variable frequency supply; one or more electrical motors operated from said supply substantially at synchronous speed for governing the lineal speed of said material; a variable ratio transmission mechanism for driving the reel; an induction motor operated from said supply for driving the variable ratio transmission mechanism; and means responsive to change in the slip speed of the induction motor from a desired value for correctively adjusting the ratio of the variable ratio transmission for maintaining the slip speed at said desired value despite changes in reel diameter and changes in material speed resulting from a variation in the frequency of said supply.

7. In a system for controlling the tension of material at a reel: a variable ratio transmission mechanism for driving the reel; an induction motor for driving the variable ratio transmission mechanism; means providing a reference standard to which the slip speed of the induction motor may be compared to provide an error indication; means operable upon indication or error for correctively adjusting the ratio of the variable ratio transmission for reducing the error; means correlated with the adjustment of the variable ratio transmission mechanism for modifying the reference standard whereby tension is determined as a function of reel diameter; and means for controlling the degree to which said modifying means operates.

8. In a system for controlling the tension of material at a reel: a variable ratio transmission mechanism for driving the reel; an induction motor for driving the variable ratio transmission mechanism; means providing a signal corresponding to the slip speed of the induction motor; means providing a set point signal to which said slip speed signal may be compared to provide an error signal; and polarity sensitive motor means actuated by said error signal for adjusting the ratio of the variable ratio transmission for confining the error signal to a small value.

9. In a system for controlling the tension of material at a reel: a variable ratio transmission mechanism for driving the reel; an induction motor for driving the variable ratio transmission mechanism; means providing a signal corresponding to the slip speed of the induction motor; means providing a set point signal to which said slip speed signal may be compared to provide an error signal; polarity sensitive motor means actuated by said error signal for adjusting the ratio of the variable ratio transmission for confining the error signal to a small value; and means correlated with the adjustment of said variable ratio transmission for modifying the set point signal whereby tension is controlled as a function of reel diameter.

10. In a servo system for controlling the tension of material at a reel: a variable frequency supply; one or more electrical motors operated from said supply substantially at synchronous speed for governing the lineal speed of said material; a variable ratio transmission mechanism for driving the reel and having a member movable to vary the ratio of transmission; an induction motor operated from said supply for driving the variable ratio transmission mechanism; means producing a signal proportional to slip speed of the induction motor; means providing a reference standard to which the slip speed signal may be compared to provide an error indication; and means connected to said movable member and operable upon indication or error for correctively adjusting the ratio of the variable ratio transmission for reducing the error.

11. In a system for controlling the tension of material at a reel: a variable frequency supply; one or more electrical motors operable substantially at synchronous speed for governing the lineal speed of said material; a variable ratio transmission mechanism for driving the reel; an induction motor for driving the variable ratio transmission mechanism; means providing a reference standard to which the slip speed of the induction motor may be compared to provide an error indication; means operable upon indication or error for correctively adjusting the ratio of the variable ratio transmission for reducing the error; and means correlated with the adjustment of the variable ratio transmission mechanism for modifying the reference standard whereby tension is determined as a function of reel diameter.

12. In a system for controlling the tension of material at a reel: a variable frequency supply; one or more electrical motors operable substantially at synchronous speed for governing the lineal speed of said material; a variable ratio transmission mechanism for driving the reel; an induction motor for driving the variable ratio transmission mechanism; differential means for comparing the synchronous speed with the speed of said induction motor for providing an electrical signal corresponding to slip speed of said induction motor; means providing a set point voltage to which said slip speed signal may be compared to provide an error signal, and including two serially connected resistors connected as a load across a regulated power supply, together with adjustable tap means cooperable with one of said resistors to provide said set point voltage; polarity sensitive motor means actuated by said error signal for adjusting the ratio of the variable ratio transmission for confining the error signal to a small value; means correlated with the adjustment of said variable ratio transmission for continuously varying the second of said load resistors whereby the set point voltage varies as a function of reel diameter.

13. The combination as set forth in claim 12 together with a third adjustable resistor serially inserted in said load circuit for modifying the relative effect upon set point voltage of change in the value of said second resistor.

14. In a system for controlling the tension of material at a reel: a variable frequency supply; one or more electrical motors operated from said supply substantially at synchronous speed for governing the lineal speed of said material; a variable ratio transmission mechanism for driving the reel; a drive motor for driving the variable ratio transmission and operated from said supply; and control means for adjusting the variable ratio transmission to maintain the power of said drive motor proportional to the lineal speed of said material to maintain tension constant despite change in supply frequency.

References Cited by the Applicant

UNITED STATES PATENTS

| | | | |
|---|---|---|---|
| 2,685,055 | 7/54 | Winther | 318—326 X |
| 2,748,299 | 5/56 | Weesner et al. | 318—6 X |
| 2,850,654 | 9/58 | Jaeschke | 318—32 X |
| 2,864,040 | 12/58 | Trotsky | 318—99 X |
| 2,895,096 | 7/59 | Wallace | 318—146 |
| 3,024,395 | 3/62 | Petersen et al. | 318—72 X |
| 3,035,193 | 5/62 | Ethier | 318—6 X |

FOREIGN PATENTS

| | | |
|---|---|---|
| 11,569 | 2/56 | Germany. |
| 1,107,790 | 5/61 | Germany. |

ORIS L. RADER, *Primary Examiner*.